United States Patent [19]

Werner

[11] Patent Number: 5,020,263
[45] Date of Patent: Jun. 4, 1991

[54] FISH ACTUATED ICE FISHING SIGNALING DEVICE AND METHOD OF USING IT

[76] Inventor: William A. Werner, 617 Sharon Rd., Oakley, Mich. 48649

[21] Appl. No.: 498,427

[22] Filed: Mar. 26, 1990

[51] Int. Cl.$^5$ .......................................... A01K 97/12
[52] U.S. Cl. ...................................................... 43/17
[58] Field of Search ..................................... 43/16, 17

[56] References Cited

U.S. PATENT DOCUMENTS

| 4,662,099 | 5/1987 | Stewart | 43/17 |
| 4,794,718 | 1/1989 | Tillman | 43/17 |

FOREIGN PATENT DOCUMENTS 3219504  5/1983  Fed. Rep. of Germany .......... 43/17

*Primary Examiner*—Kurt Rowan
*Attorney, Agent, or Firm*—Learman & McCulloch

[57] ABSTRACT

A signaling fishing tip-up unit has an upright frame with a base adapted to rest on the ice surrounding a fishing opening. The base has a fishing line-passing opening and a reel, on which a fishing line is wound, is supported on the frame above the opening in the base with the line extending down through the opening in the base to support a bait or lure in the water below the ice. A retainer is on the frame, and an elongate ribbon spring is also mounted on the frame and normally biased to support a signal flag in an upright position. A keeper on the flag is adapted to be received by the retainer, when the ribbon spring is depressed from its upright position, to retain the spring in a ready state of depressed arcuate configuration. A generally horizontally movable trigger, having a ready position and a tripping position, has a line accommodating member on an inner end, through which a slacked laterally displaced portion of the line extends when the trigger is in ready position. The trigger has a trip in alignment with the keeper so that it will relatively displace the keeper and retainer and release the flag to spring upwardly when a fish takes the lure and pulls on the line to pull the trigger toward the opening in the base to tripping position.

19 Claims, 2 Drawing Sheets

FISH ACTUATED ICE FISHING SIGNALING DEVICE AND METHOD OF USING IT

BACKGROUND OF THE INVENTION

This invention relates to signaling tip-ups of the type used by ice fisherman, and more particularly to tip-ups which support housing-enclosed reels in position over fishing holes cut in the ice to signal when a fish strikes the bait or lure on the line, and methods of using such tip-ups. A considerable number of ice fishing tip-ups of various types have been previously designed and are disclosed in the following U.S. Pat. Nos.:

| | |
|---|---|
| 3,660,923 | Johnson |
| 3,727,342 | Lindsey, Jr. |
| 4,253,262 | Johnson |
| 4,270,297 | Yates |
| 4,522,572 | Hahn |
| 4,567,686 | Akom |
| 4,571,876 | LeClair |
| 4,651,460 | Sykes |
| 4,662,099 | Stewart |
| 4,685,240 | Fralick |
| 4,707,932 | Sonnemaker |
| 4,780,979 | Dyck et al |
| 4,787,166 | Vogt et al |
| 4,862,627 | Keller |

The tip-up device which forms the subject matter of the present invention is, however, considered to embody significant improvements which enhance the marketability of the device and render it more reliably and conveniently useful to ice fisherman.

SUMMARY OF THE INVENTION

Generally the signaling tip-up device of the present invention contemplates an enlarged, handle-like frame which readily and removably mounts a closed face, spin-casting reel in a position such that its line can extend down through an opening provided in a disc-like plastic base which is of a size to cover an augered hole cut in the ice. A reel of this type is equipped with a drag and an anti-reverse lock to facilitate a particular type of ice fishing, and can be a commercially available reel of this type which is simply removed from a conventional fishing rod in the winter time to be used in the manner indicated. A fish actuated trigger or trip is incorporated to interact with the fishing line to release a spring-steel-band-mounted signal flag, when subjected to the slightest pull as a result of the bite of a fish. Activation of the trigger results in disengagement of the flag from a lowered inoperative position to a raised signaling position. The fisherman will be able to readily monitor the device and travel rapidly to the hole to reel in the fish.

One of the prime objects of the present invention is to design a very compact and functional tip-up of the character described which includes a handle-like frame for supporting a conventional spin casting reel, a signal flag, and a trigger or trip mechanism in position above a base which covers the hole augered into the ice.

Still another object of the invention is to design a novel tip-up in which a very simple and reliable trigger is so connected with the fishing line that the slightest pull due to the bite of a fish releases the signaling flag.

Another object of the invention is to provide a tip-up of the type described having a base which can take advantage of sunlight rays to aid in preventing the hole from freezing over due to cold temperatures and the blowing and drifting of snow.

A further object of the invention is to design a handle-like frame for the tip-up which facilitates the transport of the device from location to location and further facilitates the reeling in of the line.

Still a further object of the invention is to design a tip-up of the character described which can be very economically manufactured and marketed at prices well within the budget of the great majority of ice fisherman.

Other objects and advantages of the invention will be pointed out specifically or will become apparent from the following description, when it is considered in conjunction with the appended claims and the accompanying drawings.

DESCRIPTION OF THE EMBODIMENT ILLUSTRATED

Figure 1:
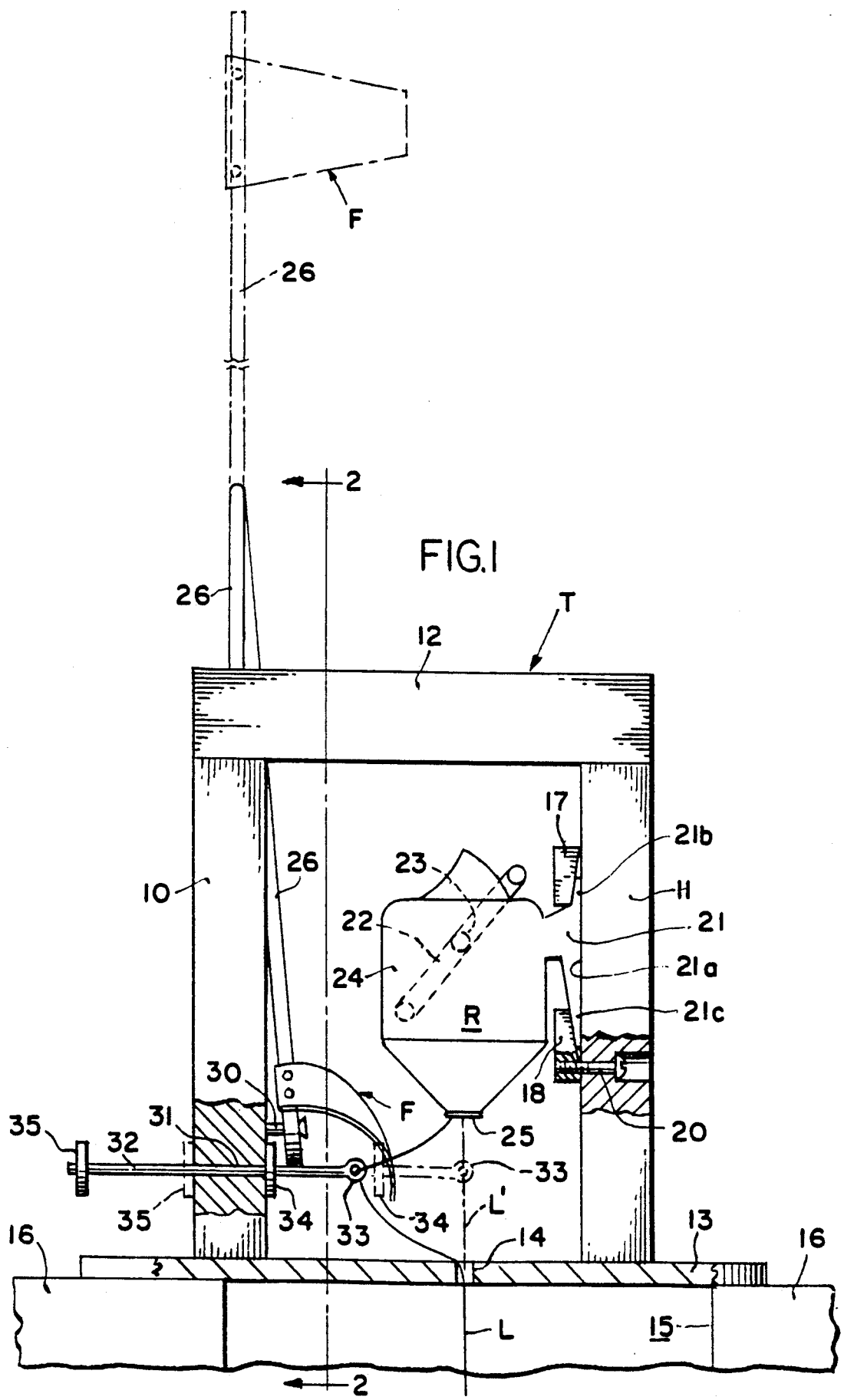
FIG. 1 is a side elevational view of the tip-up showing it mounted in position over an ice fishing hole cut in the ice in readiness for actuation, the chain lines showing the position of the elements when the signaling flag is released to spring to a raised signaling position.

Referring now more particularly to the accompanying drawings, the tip-up of the present invention comprises a handle shaped frame T of inversely U-shaped configuration, which is made up of side legs 10 and 11 joined to a graspable top bar 12. A disc-like circular base 13, secured to the lower ends of legs 10 and 11, is shown as provided with an off-axis opening 14 for passage of a fishing line, generally designated L. The frame T formed by members 10–13, may readily be formed of plastic, and the upper surface of disc 13 may be painted black so that it will absorb the rays of sunlight and warm the base 13 so that it tends to prevent the opening 15, which has been cut or augered in the ice cap 16, from freezing over. The members 10–12 may be conveniently molded in one piece in the manner disclosed.

Provided on side leg 11, are a pair of vertically spaced wedge bars 17 and 18 which may be conveniently fixed in position by screws or the like 20 to support the base 21 of a typical closed housing reel generally designated R, the base 21 having a flat base surface 21a, and wedge shaped extensions 21b and 21c which are captured by the mount blocks 17 and 18, and held in position thereby. The reel R may be one of a number of commercially available, closed-face, spin casting reels. Such reels are provided with a handle 22, mounted on a shaft 23, which operates the winding and unwinding reels, which are completely enclosed by the housing 24 of the reel R. As shown, such reels have a convergent portion at one end which include an opening 25 to pass line L which is wound on the reel enclosed in the housing 24. The opening 25 is of a diameter to maintain the egressing portion of the line vertically aligned with opening 14.

Figure 2:
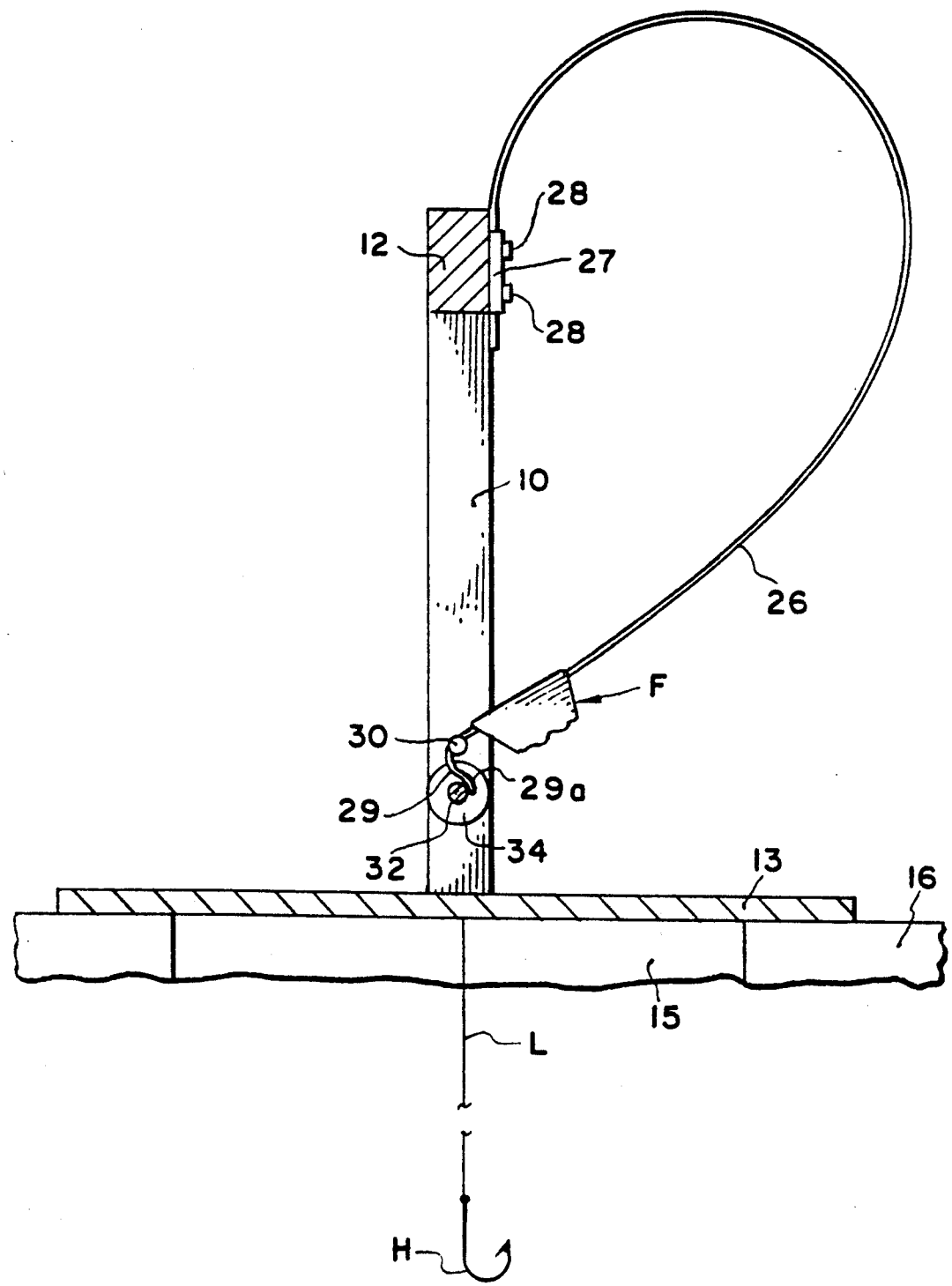
FIG. 2 is a transverse sectional view taken on the line 2—2 of FIG. 1.

A signaling flag, generally designated F, is secured to a spring steel band 26 which has one end fixed to top bar 12 by a clamp plate 27 and screws 28. The opposite end of band 26 extends beyond the flag F and has a hook shaped keeper portion 29 formed with a reversely turned terminal end 29a. As shown in FIG. 2 particularly this hook shaped end 29 can be hooked over a retainer post 30 projecting inwardly from side leg 10 at a location slightly below the lower end of reel housing 24. When in this position, the deformed spring band 26 will be retained in the ready position illustrated in FIG. 2 in which it is inoperative in the sense that it is not in a raised signaling position.

Also supported by leg 10, in a horizontal slide opening 31 which is generally in vertical alignment with post 30, is a linearly movable, reciprocating trigger or trip generally designated 32. The trigger pin 32 is formed with an eye 33 at its inner end through which the line L is extended as shown in FIG. 1. In this position of the pin 32, the line L has a slack loop-like portion x, and an actuating plate or disc 34, fixed on pin 32, is in a position against the locating inner wall of leg 10 behind the hooked end 29 of band 26 but adjacent thereto. Also provided on the pin 32 so as not to restrict reeling in of the fish, is a stop disc 35 which is fixed thereto and limits the inward travel of the pin 32 from the position in which it is shown in FIG. 1 in solid lines to the position in which it is shown in chain lines.

THE OPERATION

In operation, the device is readied for actuation by disposing it over the opening 15 in the ice 16, with pin 32 in the outboard position and the line L slacked in the manner indicated at x. With the slightest pull on line L caused by a fish taking the bated hook H or any suitable lure, the line L will be pulled taut to the chain line position shown in FIG. 1 at L'. When this occurs, pin 32 is moved in an inward direction and disc 34 pushes the terminal portion 29a of the spring band 26 inwardly to dislodge the hooked portion 29 from the retainer post 30. Spring steel band 26 then springs sharply to the raised signaling position in which it is shown in chain lines in FIG. 1.

The fisherman, having thus been alerted, can proceed to the hole 15 and, with one hand grasping the top bar 12, can operate the reel R to wind in the line L sufficiently to dispose the hook 8 only a short distance below the opening 14. The handle-like frame formed by members 10–13 can then simply be lifted and moved to a position on the ice 16 near hole 15 but sufficiently far from the hole 15 so that the fisherman can remove the fish from the hook H without danger of the fish slipping away into the opening 15. The device is not triggered by any required rotation of the wind-up reel enclosed in reel R, and is considered to be far more sensitive than tip-ups which are triggered by rotation of the reel on which the line is wound. Less pull is required, in other words, to straighten the looped portion x of the line L than to unwind a reel on which the line is wound. Accordingly, the present invention provides a very practical tip-up of extremely sensitive character which signals with the slightest bite of a fish.

Although preferred embodiments of the invention have been illustrated in the accompanying drawings and described in the foregoing detailed description, it will be understood that the invention is not limited to the embodiment disclosed, but is capable of numerous rearrangements, modifications and substitutions of parts and elements without departing from the spirit of the invention which is defined in the following claims.

What is claimed is:
1. A signaling fishing tip-up unit comprising:
 a. an upright frame having a base adapted to rest on the ice surrounding a fishing opening therein;
 b. said base having a fishing line-passing-opening therein, adapted to be positioned over the fishing opening in the ice;
 c. a reel, on which a fishing line is wound, supported on said frame at a spaced distance above said opening in the base, with the line extending vertically as it leaves the reel and down through said opening in the base to support a baited hook or lure in the water below the ice;
 d. A retainer on said frame below said reel at a level opposite the portion of said line between the reel and opening in the base;
 e. a signal assembly comprising an elongated spring mounted on said frame with a signal device near the upper end thereof and normally biased to support the assembly in an upright position in which the spring is generally vertically upright with the signal device above the frame;
 f. a keeper surface on said signal assembly adapted to be received by said retainer when the spring is depressed from its upright position; the keeper and retainer being configured such that, when the keeper and retainer are in alignment, the spring is retained with its upper end vertically downturned in a state of depressed arcuate configuration, but is permitted to spring free to vertically upright position when the keeper and retainer are relatively horizontally displaced;
 g. a generally horizontally movable trigger having an inner end movable between a ready position and a tripping position, carried by said frame and having a line accommodating member on said inner end, through which a slacked portion of said line extends when the trigger is in ready position, said trigger inner end in the ready position holding the line in a vertically slacked condition, and in tripping position being moved as the pull of a fish tautens the line;
 h. said trigger having a trip part thereon in horizontal alignment with said keeper so that it will push said keeper to relatively horizontally displace said keeper and retainer when a fish takes the lure to release the signal assembly to assume an upright position.

2. The combination defined in claim 1 wherein said frame is in the form of an inversely U-shaped handle having spaced apart legs, and the base comprises a disc extending perpendicularly to the legs to which the legs are secured.

3. The combination defined in claim 2 wherein said handle frame has a pair of side legs connected at their lower ends to said disc.

4. The combination defined in claim 3 wherein wedge shaped feet are provided as a base for said reel.

5. The combination defined in claim 4 wherein one of said legs has a pair of vertically spaced mount blocks of wedge shape, providing openings to receive the wedge shaped feet on said fishing reel, and mount it in position with its egressing line maintained vertically aligned wit said opening in the base disc.

6. The combination defined in claim 2 wherein said retainer and trigger are mounted on the same side leg in juxtaposed position.

7. The combination defined in claim 6 wherein said trigger has a stop thereon preventing said line accommodating member from moving past axial alignment with said opening in the disc, when the pressure of a fish on the line pulls the trigger inwardly toward alignment with the opening in the disc.

8. The combination defined in claim 1 wherein said retainer is an inwardly extending horizontal post, and said keeper comprises a hook on said flag adapted to be received by the undersurface of said post.

9. The combination defined in claim 1 in which said reel is a housing enclosed, spin casting reel having a line passing opening in its lower end through which said line extends.

10. The combination defined in claim 9 in which said line accommodating member on the inner end of the trigger is an eye.

11. A signaling fishing tip-up unit comprising:
 a. an inversely U-shaped upright handle frame having a base adapted to rest on the ice surrounding a fishing opening therein;
 b. said base having a fishing line-passing-opening therein adapted to be positioned over the fishing opening in the ice;
 c. a handle winding, adjustable drag, reel, on which a fishing line is wound, supported on said frame at a spaced distance above said opening in the base with the line extending down through said opening in the base to support a bait or lure in the water below the ice;
 d. a retainer on said frame;
 e. a signal flag having an elongate ribbon spring mounted on said frame, and normally biased to support the flag in an upright position in which the ribbon spring is generally vertically upright;
 f. a keeper on said flag adapted to be received by said retainer when the ribbon spring is deformed from its upright position; the keeper and retainer being configured such that the ribbon spring is normally retained in a state of deformed arcuate configuration but is permitted to spring free to vertically upright position when the keeper and retainer are relatively displaced;
 g. a movable trigger having a ready position and a tripping position, carried by said frame and having a line accommodating member on an inner end, through which a slacked, laterally displaced portion of said line extends when the trigger is in ready position;
 h. said trigger having a trip associated with said keeper so that it will release said keeper when a fish takes the lure and pulls on the line to pull the trigger toward the opening in the base to tripping position.

12. The combination defined in claim 11 wherein wedge shaped feet are provided as a base for said reel.

13. The combination defined in claim 12 wherein one of said legs has a pair of vertically spaced mount blocks of wedge shape, providing openings to receive the wedge shaped feet on said fishing reel and mount it in position with its line generally aligned with said opening in the base disc.

14. The combination defined in claim 11 wherein said retainer and trigger are mounted on a side leg in juxtaposed position.

15. The combination defined in claim 11 wherein said line accommodating member is an eye and said trigger has a stop thereon preventing said eye from moving past axial alignment with said opening in the disc, when the pressure of a fish on the line pulls the trigger inwardly toward alignment with the opening in the disc.

16. In a method of readying for operation a signaling, fishing tip-up unit comprising an upright frame having a base adapted to rest on the ice surrounding a fishing opening therein, the base having a fishing line-passing-opening therein adapted to be positioned over the fishing opening in the ice, a reel, on which a fishing line is wound, supported on the frame at a spaced distance above the opening in the base with the line leaving the reel vertically and extending down through the opening in the base to support a bait or lure in the water below the ice, a retainer on the frame, a signal flag having an elongate spring mounted on the frame and normally biased to support the flag in an upright position in which the ribbon spring is generally vertically upright, a keeper on the flag adapted to be received by the retainer when the ribbon spring is depressed from its upright position; the keeper and retainer being configured such that the spring is normally retained in a state of deformed arcuate configuration but is permitted to spring free to vertically upright position when the keeper and retainer are relatively displaced, a generally horizontally movable trigger movable between a laterally outward ready position and a laterally inward tripping position, carried by the frame and having a line accommodating member on an inner end, through which a slacked laterally displaced portion of the line extends when the trigger is in ready position, the trigger having a trip fixed thereon in alignment with the keeper so that it will push the keeper to relatively displace the keeper and retainer when a fish takes the lure and pulls on the line to pull the trigger to tripping position, so that the trip will displace the keeper from the retainer, the steps of:
 a. moving the trigger laterally outwardly to ready position and laterally displacing the line to provide a vertically slacked arcuate portion therein; and
 b. deforming the flag spring to depressed down position and positioning the keeper laterally inward of the trip and securing it relative to the retainer to removably retain the flag in down position.

17. A signaling fishing tip-up unit comprising:
 a. an upright frame having a base adapted to rest on the ice surrounding a fishing opening therein;
 b. said base having a fishing line-passing-opening therein, adapted to be positioned over the fishing opening in the ice;
 c. a reel, on which a fishing line is wound, supported on said frame at a spaced distance above said opening in the base, with the line extending down through said opening in the base to support a baited hook or lure in the water below the ice;
 d. a retainer on said frame below said reel at a level opposite the portion of said line between the reel and opening in the base;
 e. a signalling assembly comprising an elongate spring mounted on said frame with a signal device near the upper end thereof, and normally biased to support the signal device in an upright position in which the spring is generally vertically upright and the signal deice is above the frame;
 f. a keeper surface on said signalling assembly adapted to be received by said retainer when the spring is depressed from its upright position; the keeper and retainer being configured such that when the keeper and retainer are in alignment the spring is retained with its upper end vertically downturned in a state of depressed arcuate configuration, but is permitted to spring free to assume a vertically upright position when the keeper and retainer are relatively horizontally displaced;

g. a trigger having an inner end movable between a ready position and a tripping position, carried by said frame and having a line accommodating member on an inner end, through which a vertically slacked portion of said line extends when the trigger is in ready position;

h. said trigger having a trip part thereon in alignment with said keeper so that it will push said keeper to relatively displace said keeper and retainer when a fish takes the lure and pulls on the line to pull the trigger toward the opening in the base to tripping position so that the trip will displace the keeper from the retainer;

i. said frame being in the form of an inversely U-shaped handle with spaced apart legs, and the base comprising a disc spanning the legs to which the legs of said handle secure.

18. A signaling fishing tip-up unit comprising:

a. an upright frame having a base adapted to rest on the ice surrounding a fishing opening therein;

b. said base having a fishing line-passing-opening therein, adapted to be positioned over the fishing opening in the ice;

c. a reel, on which a fishing line is wound, supported on said frame at a spaced distance above said opening in the base, with the line extending down through said opening in the base to support a baited hook or lure in the water below the ice;

d. a generally horizontally projecting retainer on said frame below said reel at a level opposite the portion of said line between the reel and opening in the base;

e. a signalling assembly comprising an elongate spring mounted on said frame with a visible signal near the upper end thereof and normally biased to support the signal in an upright position in which the spring is generally vertically upright and the signal is above the frame;

f. a keeper surface on said signal assembly adapted to be received by said retainer when the spring is depressed from its upright position; the keeper and retainer being configured such that when the keeper and retainer are in alignment the spring is retained with its signal end vertically downturned in a state of depressed arcuate configuration, but is permitted to spring free to assume a vertically upright position when the keeper and retainer are relatively horizontally displaced, one of said retainer and keeper being a post and the other a hook-like surface;

g. a generally horizontally movable trigger having an inner end movable between a ready position and a tripping position, carried by said frame and having a line accommodating member on said inner end, through which a slacked portion of said line extends when the trigger is in ready position;

h. said trigger having a trip part thereon in horizontal alignment with said keeper so that it will push said keeper to relatively horizontally displace said keeper and retainer when a fish takes the lure and pulls on the line to pull the trigger to tripping position so that the trip will displace the keeper from the retainer.

19. The combination defined in claim 18 wherein said retainer is an inwardly extending horizontal post, and said keeper comprises a hook on said flag adapted to be received by the undersurface of said post.

* * * * *

UNITED STATES PATENT AND TRADEMARK OFFICE
CERTIFICATE OF CORRECTION

PATENT NO.  : 5,020,263
DATED       : June 4, 1991
INVENTOR(S) : William A. Werner It is certified that error appears in the above-identified patent and that said Letters Patent is hereby corrected as shown below:

Column 4, line 60, change "wit" to -- with --.

Column 6, line 60, change "deice" to -- device --.

Signed and Sealed this

Twenty-ninth Day of September, 1992

*Attest:*

DOUGLAS B. COMER

*Attesting Officer*     *Acting Commissioner of Patents and Trademarks*